3,356,458
CHROMATOGRAPHIC ANALYSIS
Shelton E. Steinle, Richmond, William B. Milligan, El Cerrito, and Frederick Comendant, Berkeley, Calif., assignors to Shell Oil Company, New York, N.Y., a corporation of Delaware
Filed Sept. 13, 1965, Ser. No. 486,921
16 Claims. (Cl. 23—230)

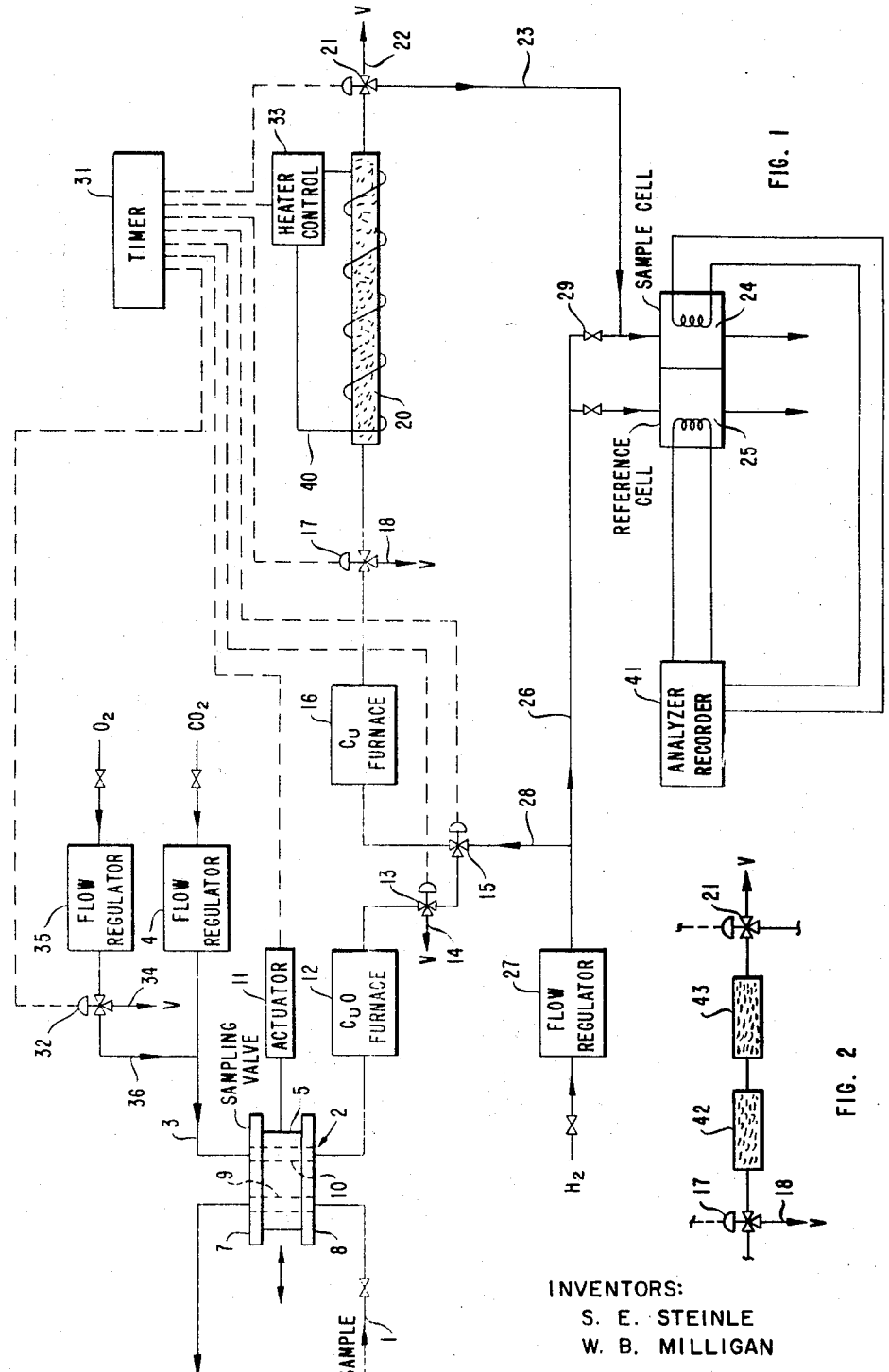

This application is a continuation-in-part of United States patent application Serial No. 400,427, filed September 30, 1964, and now abandoned.

This invention relates to the analysis of a fluid stream to determine the concentration of constituents therein, and in particular constituents present in trace or minute concentrations. More specifically, this invention relates to the analysis of liquid hydrocarbon streams to determine the concentration of total trace nitrogen.

In the analysis of fluid streams to determine the concentrations of the constituents making up the fluid, one analysis procedure which has become very important is that of elution chromatography. In elution chromatography, a sample of the fluid to be analyzed is introduced into a stream of carrier gas, usually an inert gas or hydrogen, and swept by the carrier gas into a column containing or packed with a material which selectively retards the passage therethrough of the various constituents in the fluid by selectively adsorbing the constituents. The continuing flow of carrier gas attempts to strip or force the various constituents from the column, while the packing material attempts to hold the various constituents, resulting in the various constituents traveling through the column at different rates of speed according to their affinity for the packing material and thereby causing an effective separation of the various constituents into zones. The effluent from the column, therefore, consists initially of the carrier gas followed by zones of the individual constituents of the fluid mixture in the column which appear at spaced time intervals and may be detected by utilizing some chemical or physical property of the desired constituent or constituents, e.g., a thermal conductivity analyzer may be utilized.

While theoretically the constituents leave the column in zones spaced or separated in time from one another, in a practical chromatographic analysis, overlap of the zones of two constituents often occurs. This is because, contrary to the theoretical assumption that the sample is instantaneously introduced into the chromatographic column before separation begins, the sample introduced actually has a finite volume which requires a finite period of time to completely pass into the column. This additional period of time or time lag broadens or lengthens the zones corresponding to each of the constituents and, in the case of zones which are close together, may cause an overlap. Although the separation between zones or constituents may be increased by lengthening the chromatographic column, such a solution to the problem causes a decrease in the detected peak heights corresponding to the constituents to occur with the resulting loss in sensitivity and, therefore, is not always a satisfactory method of solving the separation problem.

Accordingly, it is the primary object of this invention to provide a method for the chromatographic analysis of a fluid which eliminates the problems caused by noninstantaneous introduction of the sample into the chromatographic column.

According to the invention, the sample of fluid to be analyzed is injected into a stream of a first carrier gas and swept into a column or zone containing a material which selectively retards the passage therethrough of the constituents of the fluid-carrier gas mixture and which totally adsorbs the mixture. Preferably, but not necessarily, the first carrier gas is more strongly adsorbed by the material in the column than the constituent or constituents of the sample which are to be detected. Before the column is completely filled with mixture, the flow of the stream of first carrier gas is terminated. The mixture is then eluted from the column by a stream of a second carrier gas, which is less adsorbed or retarded to a lesser degree by the material in the column than the constituent to be detected, and into a standard chromatographic analyzer. In the preferred embodiment of the invention, the unfilled portion of the column functions as a separating zone to selectively separate the constituents as in a conventional chromatographic separating column, and no additional separating column or zone for this purpose need be supplied with the chromatographic analyzer. Since the sample of fluid is already totally within the column before the stripping by the second carrier gas is begun, this has the effect of instantaneously injecting the sample into the separating portion of the column.

Alternatively, after the constituents of the fluid-carrier gas mixture have been adsorbed or stored in the column and the flow of first carrier gas terminated, the constituents may then be stripped from the column by the stream of second carrier gas and into a standard chromatographic analyzer including a chromatographic separating column. Obviously in such an arrangement it is not necessary that any appreciable length of the storage column be left unfilled, but care need only be taken that the storage column is not completely filled so as to cause an effluent from the storage column or zone to occur, and thereby cause a loss of a portion of the constituents making up the total volume of fluid sample.

The analysis method according to the invention has particular applicability when large samples must be utilized for the analysis, as when measuring minute concentrations, i.e., a few parts per million, and/or when the sample requires prior preparation and therefore may not be entirely simultaneously available.

One such situation in the oil industry is the measurement of total trace nitrogen in liquid hydrocarbon streams in oil processes such as Platforming and Hydrocracking. In such processes, the concentration of nitrogen compounds, which is normally controlled by feed stock blending and by hydrotreating, must be kept at a low level in order to avoid catalyst poisoning. To determine the nitrogen content in the liquid hydrocarbon streams in the above-mentioned oil process, old and well-known analysis techniques, the Kjeldahl or the Dumas Nitrogen Analysis techniques, have heretofore been used whenever possible. According to the Dumas technique, a sample of the liquid hydrocarbon, about 10–100 microliters, is oxidized in a furnace containing copper oxide (CuO), after which the oxidation products are heated in a copper furnace to reduce any of the oxides of nitrogen present to molecular nitrogen. The nitrogen in the effluent from the copper furnace may then be detected by any conventional nitrogen-detecting apparatus, e.g., a chromatographic analyzer or a nitrometer.

While the above-mentioned procedure operates satisfactorily for detecting total nitrogen in hydrocarbon streams where the nitrogen content is relatively high, e.g., 200–300 parts per million, when it is desired to detect the nitrogen levels in the order of 0 to 25 or 30 parts per million, as is often required with present day oil processes, the above-mentioned analysis technique does not provide satisfactory results. These unsatisfactory results are due to the inability of the known methods of detecting nitrogen gas to respond to the very low concentrations mentioned above in the extremely small sample, that is, 25 parts per million in a 10 microliter sample. In order to eliminate this deficiency, attempts have been made utilizing larger samples for the analysis. However, these attempts have not produced satisfactory results because of the inherent problems in oxidizing a large sample of a liquid hydrocarbon, problems which are eliminated by using small samples for the analysis. These problems are mainly the rapid and large volume expansion of the liquid hydrocarbon when it is oxidized and the difficulty of insuring complete combustion of this large sample to convert the minute quantities of nitrogen to molecular nitrogen. Accordingly, in those chemical processes where it is necessary to maintain the nitrogen level at the extremely low concentrations mentioned above, it has become the practice to analyze the samples for the nitrogen content by long and tedious laboratory methods, e.g., the Kjeldahl method, which require a number of hours for the determination to be made. Since during this period the nitrogen level may be in excess of the desired quantity, such a procedure is obviously uneconomical and unsatisfactory in that during the relatively long time while the analysis is being made, poisoning of the catalyst and thereby a decrease in the production of the desired hydrocarbon products may occur. Moreover, poisoning of the catalyst will require more frequent shutdowns of the process in order to change the catalyst.

Accordingly, it is another object of this invention to provide a novel and improved method for the semicontinuous analysis of a fluid stream to detect total trace impurities in the fluid stream and, more particularly, to detect the total trace nitrogen in a stream of liquid hydrocarbons.

Briefly, according to the preferred embodiment of the invention, each sample of a preset quantity of discrete small constant volume samples, e.g., 10 microliters, of the fluid to be analyzed, that is, the stream of liquid hydrocarbons, is sequentially injected at spaced intervals, preferably regular intervals, into a stream of carrier gas. The stream of carrier gas, preferably $CO_2$ including the discrete samples of liquid hydrocarbon, is then passed through the oxidizing furnace (CuO furnace) and the reducing furnace (Cu) whereby any nitrogen compounds in the hydrocarbon have been converted to molecular nitrogen. It should be noted that in this manner the discrete small samples of the liquid hydrocarbon are individually oxidized and reduced, thereby eliminating the problems inherent in oxidizing large samples due to the rapid increase in volume when the sample is combusted. The effluent from the reducing furnace, which comprises the carrier gas, the molecular nitrogen, and the other combustion products are collected or stored in a zone or column containing a material which selectively retards the passage therethrough of the various gaseous components of the effluent and which totally absorbs the carrier gas, e.g., a chromatographic column packed with molecular sieve. This collection of the combustion products of a plurality of samples of a liquid hydrocarbon results in a concentration of the various constituents or components of the hydrocarbon in the sorbent material with the result that any effluent from the column or zone will appear as though only a single large sample had been introduced. The flow of carrier gas to the collecting zone or column is terminated after all the combustion products have been collected, but before the column is completely filled. Following termination of the flow of carrier gas, the collected sample constituents are forced from the zone or column by means of a second carrier gas, e.g., hydrogen, having a lower affinity for sorbent material in the column than the sample components to be detected. The unfilled portion of the column or zone then acts as a standard chromatographic separating column, and the effluent from the column may then be subjected to a conventional chromatographic analysis. As pointed out above, in this type of analysis, because the various constituents of the hydrocarbon travel through the packed column at different rates of speed depending on their affinities for the packing material, the effluent from the column consists initially of the second carrier gas alone, i.e., the hydrogen, and then the indivdual constituents of the fluid mixture at spaced later time intervals. As is common in the art, the individual constituents may be detected by means of a thermal-conductivity detector which compares the thermal-conductivity of the effluent gas from the column with the thermal-conductivity of the carrier gas used to drive the sample components from the column. The concentration of the constituent in the original sample to be detected, for example, trace nitrogen, may then easily be determined even when the concentrations are in the 0 to 25 or 30 parts per million range.

The above objects and advantages of the invention will be more easily understood from the following detailed description of the invention when taken in conjunction with the accompanying drawings wherein:

FIGURE 1 is a schematic representation of an apparatus arrangement for carrying out the method according to the invention; and FIGURE 2 shows a modification of the apparatus of FIGURE 1.

Referring now to FIGURE 1, there is shown a conduit 1 through which the sample stream to be analyzed, the liquid hydrocarbon, is continuously flowing. Connected in the conduit 1 is a sampling valve 2 which is also connected in a conduit 3 through which is flowing a steady stream, e.g., 80 cubic centimeters per minute, of a carrier gas, $CO_2$, which is substantially free of the constituent of the sample stream which is to be detected, in the instant case, nitrogen; the flow of the carrier gas in the conduit 3 being controlled by a flow regulator 4, e.g., to 80 cubic centimeters per minute. The sampling valve 2, which may, for example, be any conventional sampling valve of the type used in chromatographic analyzers, functions to insert discrete small constant volume samples of the fluid to be analyzed into the conduit 3. As shown schematically in the figure, the sampling valve 2 consists essentially of a block or member 5 mounted for reciprocal motion between a pair of parallel plates 7 and 8. Within the block 5 are a pair of chambers 9 and 10, which, as is conventional in this type of valve, have a volume of 10 microliters. In the position shown in the figure, the chambers 9 and 10 permit the continuous flow of the sample and the carrier gas through the conduits 1 and 3, respectively. The member 5 is reciprocated between the position shown and that in which the chamber 9 is aligned with the two portions of the conduit 3 by an actuator 11, which may, for example, be a reciprocating pneumatic piston, thereby inserting discrete samples of the fluid in conduit 1 into the carrier stream in conduit 3. Each of the discrete samples or slugs of fluid to be analyzed is carried by the stream of carrier gas into a furnace 12 containing copper oxide (CuO) which is continuously maintained at a temperature, e.g., 700 to 1000° C., sufficient to produce complete oxidation or combustion of the individual discrete slugs of fluid sample passing through the furnace and thereby free the chemically bound nitrogen. It should be noted that, since the discrete samples carried by the carrier stream are passed through the furnace 12 in a time displaced manner, the oxidation occurring in the furnace 12 is essentially that performed when utilizing this method according to the prior art, that is, the 10 microliter samples are individually oxidized, and hence the problems inherent with oxidation of large samples does not occur. All of the oxidation products from the furnace 12, which include among other products, nitrogen, oxides of nitrogen, carbon dioxide, methane, carbon monoxide and water are swept by the stream of carrier gas from the furnace 12 and into a second furnace 16 containing copper metal via a 3-way valve 13 having a ventline 14, and a 3-way valve 15. The furnace 16 is maintained at a temperature, for example, 300 to 600° C., which is sufficient to reduce the oxides in the combustion or oxidation products to their lowest stable molecular form and, in particular, the oxides of nitrogen to molecular nitrogen.

Connected to the output of the furnace 16 via a 3-way valve 17 having a ventline 18 is a column or zone 20 for the purpose of collecting the oxidation products swept from the furnace 16 by the stream of carrier gas. In order to collect and hold the combustion product gases in the column 20, column 20 is filled with a material which selectively retards the passage therethrough of the constituents or components of the gases introduced into the column by preferentially absorbing the various components according to their affinity for the packing or sorbent material and which completely adsorbs the carrier gas, i.e., the $CO_2$. Preferably, the sorbent material used is a solid adsorbent known as molecular sieve, which is sold by Linde Air Products Company as "type 5A" molecular sieve. It is to be understood, however, that various other types of adsorbent materials, such as alumina, may be used, the choice of material depending on the nature of the gaseous mixture to be analyzed. Since the carrier gas is completely adsorbed by the material in the column, there will be no fluid pressure or stream of carrier gas attempting to force the various gases out of the column 20. Consequently, the gases forming the combustion products of the various discrete samples or slugs of liquid hydrocarbon are continually collected or stored within the column or zone 20, and there is no output flow or effluent from the column 20 until such time as the column 20 is either completely filled with combustion product gases, or another carrier gas which is not strongly adsorbed in the molecular sieve material is injected into the column 20. According to the invention, however, the column 20 is of sufficient length to completely hold or store all of the combustion products and sample stream from a single cycle of analysis and still have an appreciable portion of column unfilled. Preferably, about 25–35% of the column is used for storage. However, the system has been successfully operated with up to 80% of the column capacity used for storage.

The output of column 20 is connected via a 3-way valve 21, having a ventline 22, and a conduit 23 to the inlet of the detector sample cell 24 of a dual thermal-conductivity cell 24–25. The inlet to the reference cell 25 is connected to a conduit 26 having a flow regulator 27 therein and through which flows a steady stream of a gas having very little affinity for the sorbent material in the column or zone 20 and which serves as both the reference gas for the thermal-conductivity detector and for the carrier gas to drive or sweep the various gaseous components from the column 20 at a desired time. In order that the second carrier gas, preferably hydrogen, can be used for the purpose of sweeping the constituents from the column 20, the conduit 26 is connected via a conduit 28 to the 3-way valve 15. The conduit 26 is also connected to the input of the sample cell 24 by means of a needle valve 29, which permits a very small stream, 5–10 cubic centimeters per minute, of hydrogen to continuously flow through the sample cell. This continuous flow of hydrogen through the sample cell 24 prevents damage to the cell during that period of the cycle of operation of the apparatus when there is no output flow from the column 20.

The actuator 11 and the control valves 13, 15, 17 and 21 are actuated by means of a timer 32 in a sequence to be described hereinafter to perform the desired analysis. This timer may take any desired form and, for example, may comprise a plurality of cam operated switches which tend to switch the 3-way control valves from one condition to the other. Also controlled by the timer 31 is a 3-way valve 32 and a heater control 33. The 3-way valve 32, which has a ventline 34, is connected along with a flow regulator 35 in a conduit 36 by means of which oxygen may be supplied to the stream of gas in the conduit 3 when desired. The heater control 33 is utilized to supply power at the desired time to a heater 40 for the column 20. Both the heater 40 and the oxygen in the conduit 36 are not utilized during the actual analysis of the sample, but rather are used for regeneration of the analysis apparatus following a measurement as will be explained below.

In order to perform an analysis of the liquid hydrocarbon in the conduit 1, and with carbon dioxide, hydrogen and oxygen flowing in the conduits 3, 26 and 36, respectively, the timer-programmer 31 initially positions the 3-way control valves 13, 15 and 17 to provide a direct path between the output of the furnace 12 and the input of the column 20 via the furnace 16; positions the 3-way control valve 21 so that the output of the column 20 is connected with the ventline 22; and, positions the valve 32 so that the oxygen in the conduit 36 flows out of the ventline 34. The timer 31 then energizes the pneumatic actuator 11 to operate the sampling valve 2 to insert a predetermined number of discrete small volume samples or slugs of the liquid hydrocarbon in the conduit 1, for example, twenty 10-microliter portions or about 0.2 gram, into the stream of carbon dioxide flowing in the conduit 3 at spaced intervals, for example, at 6-second intervals. However, it should be noted that the time between successive sample insertions or injections is not critical in the operation of the system according to the method. The minimum time between successive sample injections is only limited by the operating frequency of the sampling valve and the time required for each discrete sample to be oxidized and reduced in the furnaces 12 and 16, while the maximum time between successive sample injections is only limited by the size of the column 20, i.e., the column 20 must have sufficient capacity to completely adsorb the constituents and the volume of carrier gas necessary to pass all of the discrete samples necessary to make up the desired volume of fluid for the analysis into the column 20.

The sample slugs inserted into conduit 3 are carried by the stream of carbon dioxide carrier gas into the furnace 12 where the samples are sequentially oxidized and the oxidation products, which in addition to other gases will contain $N_2$, $NO_2$, $NO$, $N_2O$, $CO_2$ and $H_2O$, are swept by the carbon dioxide gas carrier through the valves 13 and 15 into the furnace 16 where the oxides of nitrogen are all reduced to molecular $N_2$. The combustion products from each of the preset number of samples or slugs of liquid inserted into the conduit 3 are sequentially swept into the column or zone 20 wherein the carbon dioxide carrier gas and the other constituents of the combustion products are totally adsorbed, resulting in an accumulation or storage of all of the combustion products and the carbon dioxide carrier in the column 20. As mentioned above, the column 20 is of sufficient capacity and length to hold all of the combustion products from the preset number of samples and the quantity of carbon dioxide gas carrier needed to transport the combustion products to the column 20 without being completely filled. After all of the combustion products have been swept into the column 20 and before the column is completely filled with the continuing flow of carbon dioxide carrier gas, the programmer timer 31 positions the 3-way control valve 13 to disconnect the output from furnace 12 from the valve 15 and connect it instead to the ventline 14, thereby preventing any further travel of the carbon dioxide carrier gas to the column 20. Simultaneously, the timer 31 positions the valve 15 to connect the conduit 28 to the input of furnace 16, thereby causing a flow of hydrogen, about 100 cubic centimeters per minute, into the column 20 to occur, and positions the 3-way valve 21 to connect the output of column 20 to the conduit 23. The hydrogen flowing through the column 20, which due to its low affinity for the molecular sieve material in the column is adsorbed only very slightly, if at all, in the column 20, attempts to force the various gases in the column out into the conduit 23. However, because of the property of the packing material in the column 20 of selectively adsorbing the various constituents in the column, the result of the carrier gas attempting to force the constituents through the column is that the various constituents are selectively retarded in their travel through the column depending upon their affinities for the packing material. The unfilled portion or zone of the column 20, therefore, acts as a standard chromatographic analyzer column as the gases accumulated and stored in the entry portion or zone of the column 20 are forced through it, with the result that the column effluent in the conduit 23 consists initially of the hydrogen gas alone with the individual constituents of the combustion gases appearing at later spaced time intervals depending upon their affinity for the molecular sieve material. In this regard, it should be noted that the longer the unfilled portion of the column 20 prior to the stripping of the column by the hydrogen gas, the greater will be the separation between the various constituents in the effluent from the column 20. Consequently, the unfilled portion of the column 20 should be of sufficient length, i.e., at least 20% of the column length, to insure positive separation between the constituent in question and adjacent constituents, thereby making the detection and measurement of the various constituents much simpler and more accurate. The flow of hydrogen through the column 20 is continued until the nitrogen peak is detected by the sample thermal-conductivity cell 24 and recorded by means of the analyzer recorder 41. Since all of the accumulated nitrogen from the various samples swept into the column 20 is measured as a single peak which represents the total trace nitrogen in a fairly large sample of liquid hydrocarbon, very small concentrations of nitrogen may be detected with the conventional detector cell shown. Moreover, since the volume of the sample is known, the peak height or area may then be correlated to the concentration of the nitrogen in the original sample stream. If desired, the signal corresponding to the concentration of the desired constituent may, instead of merely being recorded, be used to control the process from which the sample stream originated in order to vary the detected concentration.

It should be noted that, while the apparatus has been disclosed for detecting the amount of trace nitrogen in a stream of liquid hydrocarbons, other trace components in the liquid hydrocarbon may be detected by the same procedure by merely permitting the hydrogen to continue to sweep the gaseous constituents from the column 20 until a peak corresponding to the desired component is detected. For example, if it is desired to know the amount of trace sulfur in the stream of liquid hydrocarbon, then the hydrogen is continually passed through the column 20 until such time as a peak corresponding to sulfur dioxide is detected. The area or height of this sulfur dioxide peak may then be correlated to the amount of trace sulfur in the original sample stream. Trace concentrations of other elements may be found in a similar manner.

After the peak corresponding to the desired component has been detected and before another analysis cycle is begun, it is necessary to purge the column 20 of any gases still remaining therein and to recondition the furnaces 12 and 16. In order to perform this function, at a time after the detection of the desired peak in the sample cell, the timer 31 positions the 3-way valve 17 to connect the output of furnace 16 to the ventline 18; positions the valve 32 to permit the oxygen in conduit 36 to flow into the conduit 3; and, activates the heater control 33 to energize the heater 40. The oxygen introduced into the conduit 3 is carried along with the carbon dioxide through the furnace 12 where it reoxidizes the copper oxide used during the combustion process and then passes out of the system through the ventline 14. The hydrogen flowing through the copper furnace 16 via the conduit 28 and the valve 15 reduces any copper oxide formed in the furnace 16 to copper and then passes out of the system via the ventline 18. The various gases still present in the column 20, i.e., the carbon dioxide, water vapor and other combustion products, are driven from the column 20 by means of the heat applied to the column by the heater 40. These products are swept from the system via the valve 21 and the ventline 22. After a suitable period for all of these reactions to have taken place, the timer 31 deactivates the heater control 33 and returns the valves 13, 15, 17 and 32 to their initial positions whereby, after the column 20 has sufficiently cooled down, the system is ready to go through another analysis cycle.

Although the invention has been described utilizing a single column 20 for both storing and separating the gases; as was noted above, such a construction is not necessary to carry out the method of the invention. For example, as shown in FIGURE 2, the column 20 may be replaced by a pair of columns 42, 43, the first of which 42 is used for collecting or storing the carrier gas and the combustion products and the second of which 43 is used to separate the constituents. With such an arrangement, the column 42 contains a sorbent material similar to that container in the column 20, i.e., a material which will completely absorb the carrier gas and the sample constituents. On the other hand, the column 43 need not contain the same sorbent material as column 42 but in fact may comprise any standard type of chromatographic separation column which will afford the desired chromatographic separation. For example, with the column 42 packed with molecular sieve, the column 43, for nitrogen determinations, may contain silica gel or for that matter be a liquid partition column. Of course, if such a liquid partition column is used, then during the purging portion of the operating cycle mentioned above, no heat is applied to the column 43. Instead, as is well known in the art, the liquid partition column may be purged by back flushing with the second carrier gas, i.e., the hydrogen.

It should be noted that with the arrangement shown in FIGURE 2, it is theoretically possible to completely fill the storage column 42 with the stored constituents and the first carrier gas before the stream of first carrier gas is terminated. However, in order to prevent the possibility of any of the stored sample from being forced out of the storage column 42, the flow of the first carrier gas is terminated before the column 42 is completely filled. The amount left unfilled, however, need only be very small, e.g., one or two percent of the column capacity.

While the above-described method of analyzing a liquid hydrocarbon stream may be used for detecting concentrations of constituents present in any quantity, it is especially useful for automatically monitoring trace concentrations in the 0 to 50 parts per million range. In view of the extremely small quantities of the constituents present in the sample, extraneous sources of the constituent must be avoided. Since the carbon dioxide and hydrogen carrier gases are present in the column 20, these gases must be substantially free of nitrogen content in order not to produce extraneous results and to obtain good precision of measurement. While the nitrogen content of the hydrogen gas used is not extremely critical in view of the fact that the nitrogen is introduced into both the reference and sample cells, and hence a partial balancing out of the impurities in the hydrogen gas is obtained; no such balancing exists for the carbon dioxide. Accordingly, the nitrogen concentration in the carbon dioxide gas should be at least in the same range as the concentrations of nitrogen to be detected in the sample, for example, 5–10 parts per million to detect nitrogen concentrations in the 0 to 50 parts per million range, in order to achieve the proper precision of measurement. When utilizing the above-described method and apparatus for the detection of total trace nitrogen in a stream of liquid hydrocarbon and a carbon dioxide carrier gas having a nitrogen content of approximately 5 parts per million, a sensitivity of 0.5 part per million of nitrogen in the 0 to 50 parts per million range can be achieved with the entire cycle of operation taking approximately 30 minutes.

While the invention has been described using carbon dioxide and hydrogen gas as the two carrier gases, the invention is not limited to the use of these two gases, and other gas can be substituted if desired. For example, steam or any other gas which in addition to being substantially free of the trace component to be detected, i.e., nitrogen, sulfur, etc., will be totally adsorbed in the packing of the column 20 may be used in place of the $CO_2$. Similarly, instead of hydrogen, helium, argon or any other gas which has a lower affinity for the sorbent material in column 20 than the gaseous constituent to be detected and hence will not be adsorbed or have its flow retarded to the same degree as the gaseous constituent to be detected, may be used.

Although the system has basically been described and is particularly advantageous where trace concentrations of constituents are to be detected, and hence a number of small volume samples are injected into the stream of first carrier gas, it should be noted that the method according to the invention may also advantageously be used with only a single sample injection. For example, one application where a single injection method might be applied is the case where the nitrogen concentration in the fluid to be analyzed is known to be high enough to be within the sensitivity range of the chromatographic detectors used and the compounds containing the nitrogen require relatively more intense and long oxidation conditions to chemically convert all the nitrogen to molecular form. Here, too, the method according to the invention would provide the advantages of concentrating all of the constituents prior to separation and would also, as indicated above, prevent the broadening of the constituent zones in the effluent from the separating zone.

Moreover, although the invention has been described for a specific purpose wherein oxidation and reduction of the fluid sample are necessary, the method according to the invention is not so limited and may be advantageously used for other applications not requiring these steps. For example, the method may be used for trace hydrocarbon analysis from air samples. Such analyses are often used to detect hydrocarbons in oxygen or air at liquid oxygen plants and in atmosphere pollution studies. In carrying out such analyses according to the instant invention, a number of samples of the air are injected into a stream of a first carrier gas, e.g., carbon dioxide, steam, etc., and collected or stored in the molecular sieve column, i.e., column 42. After the total volume of sample has been introduced and stored in column 42 as described above, the hydrocarbon constituents may then be evolved by a stream of a second carrier gas, e.g., hydrogen, nitrogen, etc., and passed into a separating column 43, e.g., a liquid partition column, as a single zone. The separation and detection of the hydrocarbons then proceeds in the normal manner for chromatographic analyses.

Obviously, various other modifications of the invention are possible in light of the above teachings without departing from the spirit and scope of the invention. For example, the thermal-conductivity detectors may be replaced with any conventional type of detector used in gas chromatography. Moreover, the time intervals between successive sample injections may be irregular, i.e., known or controlled unequal time intervals, or the first carrier gas stream may only flow intermittently during the storage portion of the operating cycle of the system, i.e., when it is desired to transport a sample to the storage zone. The intermittent operation of the carrier stream would be particularly advantageous when a long period of time or interval exists, e.g., in the order of a number of minutes or hours, between the injection into the carrier gas stream of the individual discrete sample volumes constituting the total volume of sample to be stored and analyzed. Such a mode of operation, which, for example, might be used when it is desired to detect the average concentration of a constituent over a prolonged time interval, would permit the use of a much smaller storage column than that which could be used when the first carrier gas stream is continually flowing. It is, therefore, to be understood that within the scope of the appended claims the invention may be practiced in forms other than that specifically illustrated.

We claim as our invention:

1. The method of analyzing a fluid to determine the concentrations of the constituents of said fluid comprising:
    injecting a known volume of the fluid into a stream of a first carrier gas which is substantially free of the constituent to be detected;
    passing the carrier gas and the volume of fluid into a zone containing a material which selectively retards the passage therethrough of the constituents of said fluid and said first carrier gas and which completely adsorbs said fluid and said first carrier gas;
    terminating the flow of said stream of said first carrier gas after said volume of fluid has completely passed into said zone and before said zone is completely full;
    passing a stream of a second carrier gas, which is less adsorbed by said material than the constituent to be detected, through said zone; and
    measuring the effluent from said zone with a chromatographic analyzer to detect the particular constituent desired.

2. The method of claim 1 wherein said step of injecting a known volume of the fluid into said stream of a first carrier gas comprises:
    injecting a number of discrete samples of said fluid into said stream of carrier gas at spaced intervals of time.

3. The method of analyzing a fluid to determine the concentrations of the constituents of said fluid comprising:
    injecting a known volume of the fluid into a stream of a first carrier gas which is substantially free of the constituent to be detected;
    passing the carrier gas and the volume of fluid into a first zone containing a material which selectively retards the passage therethrough of the constituents of said fluid and said first carrier gas;
    terminating the flow of said stream of said first carrier gas after said volume of fluid has completely passed into said zone and before any effluent from said zone occurs;
    passing a stream of a second carrier gas, which is less adsorbed by said material than the constituent to be detected, through said first zone to sweep said constituents through said first zone;
    passing said stream of second carrier gas and said constituents through a second zone which selectively retards the passage therethrough of said constituents and which retards said second carrier gas to a lesser degree than the constituent to be detected, thereby causing the various constituents to pass from said second zone at spaced time intervals; and
    measuring the effluent from said second zone with a chromatographic detector to detect the particular constituent desired.

4. The method of claim 3 wherein said second zone contains the same material as said first zone.

5. The method of claim 3 wherein said second zone is a liquid partition column.

6. The method of claim 4 wherein the flow of said first carrier gas is terminated while a susbtantial portion of said first zone still remains unfilled, whereby said second zone comprises the unfilled portion of said first zone.

7. The method of claim 3 wherein said step of injecting a known volume of the fluid into said stream of a first carrier gas comprises:

injecting a number of discrete samples of said fluid into said stream of carrier gas at spaced intervals of time.

8. The method of claim 7 wherein said fluid is a liquid hydrocarbon and wherein prior to passing said stream of first carrier gas into said first zone, said stream of first carrier gas containing said discrete samples of said fluid is passed through a first furnace to oxidize each of said discrete samples and then through a second furnace to reduce the oxidation products.

9. The method claim 8 wherein said first furnace is a copper-oxide furnace and said second furnace is a copper furnace, whereby the total nitrogen content of said samples is converted to molecular nitrogen, and wherein the particular constituent detected in the effluent from said second zone is nitrogen.

10. The method of detecting trace impurity concentrations of constituents in a stream of liquid hydrocarbons comprising:
- injecting a number of discrete small volume samples of said hydrocarbon at spaced intervals into a stream of a first carrier gas which is substantially free of the constituent to be detected;
- passing said carrier stream through a first furnace to oxidize each of said discrete small volume samples and then through a second furnace to reduce the oxidation products;
- collecting the effluent from said reducing furnace in a zone containing a material which selectively retards the passage therethrough of constituents in said effluent and which totally adsorbs said constituents;
- terminating the flow of said stream of first carrier gas before said zone is completely filled with said effluent;
- sweeping the collected gases through the unfilled portion of said zone and then out of said zone with a stream of a second carrier gas which is less adsorbed by said material than said constituent to be detected; and
- measuring a property of the effluent from said zone which corresponds to said constituent of the hydrocarbon to be detected by means of a chromatographic detector.

11. The method of claim 10 wherein said constituent to be detected is nitrogen and said property of said effluent is the concentration of molecular nitrogen.

12. The method of claim 10 wherein said constituent to be detected is sulfur and said property of said effluent which is measured is the concentration of sulfur dioxide.

13. The method of detecting the total trace nitrogen concentration in a stream of liquid hydrocarbon comprising:
- injecting a predetermined number of discrete small volume samples of said liquid hydrocarbon into a stream of a first carrier gas which is susbtantially free of nitrogen;
- passing said stream of carrier gas through a copper-oxide furnace to sequentially oxidize each of said hydrocarbon samples and then through a copper furnace to reduce any oxides of nitrogen to molecular nitrogen;
- collecting and storing the effluent from said copper furnace in a zone containing a material which selectively retards the passage therethrough of the constituents of said effluent and which totally adsorbs said effluent;
- terminating the flow of said stream of said first carrier gas after the combustion products from each of said samples has been collected but before said zone is completely full of effluent;
- forcing the collected gases through the unfilled portion of said zone and out of said zone by passing a stream of a second carrier gas which is less retarded by said material than nitrogen through said zone, whereby the material in the unfilled portion of said zone causes the constituents collected in said zone to pass from said zone in time spaced relationship according to their affinity for said material; and
- measuring the total nitrogen concentration in the effluent from said zone.

14. The method of claim 13 wherein said first carrier gas is carbon dioxide.

15. The method of claim 13 wherein said second carrier gas is hydrogen.

16. The method of claim 13 wherein said material is molecular sieve.

References Cited

UNITED STATES PATENTS 3,304,159  2/1967  Hinsvark _____ 23—230

MORRIS O. WOLK, *Primary Examiner.*

R. E. SERWIN, *Assistant Examiner.*